May 7, 1940.                L. ROHDE                 2,199,757
               HIGH-FREQUENCY VOLTMETER FOR HIGH VOLTAGES
                        Filed Feb. 7, 1938
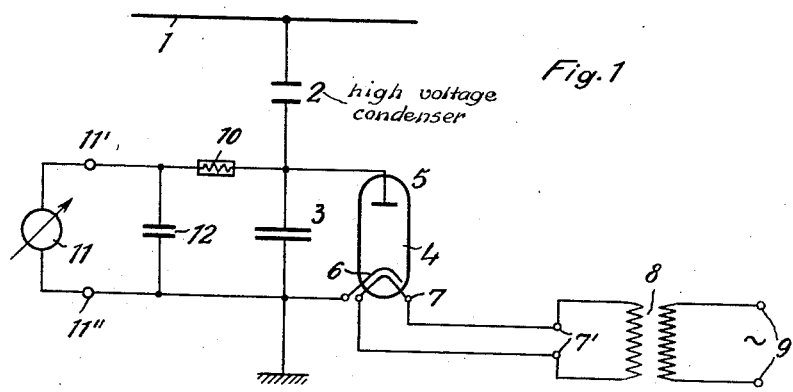
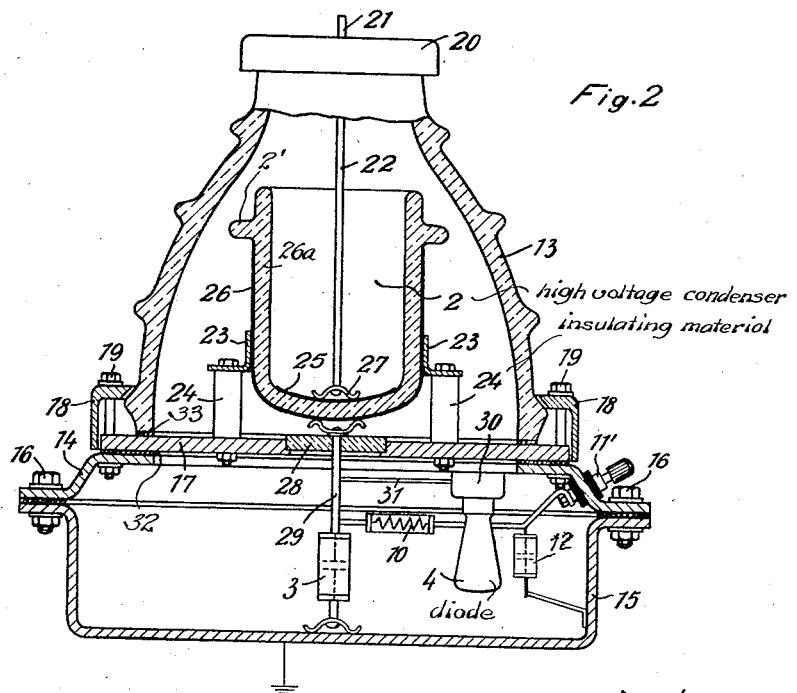

Patented May 7, 1940

2,199,757

UNITED STATES PATENT OFFICE 2,199,757

HIGH-FREQUENCY VOLTMETER FOR HIGH VOLTAGES

Lothar Rohde, Munich, Germany, assignor to Siemens & Halske, Aktiengesellschaft, Siemensstadt, near Berlin, Germany, a corporation of Germany Application February 7, 1938, Serial No. 189,281
In Germany February 11, 1937

5 Claims. (Cl. 171—95)

The present invention relates to improvements in high-frequency voltmeters for high voltages.

Amplifying or tube voltmeters for high-frequency voltage measurements are well known. Furthermore, it is known when measuring high voltages to employ a capacitive or inductive potentiometer for the connection of a voltmeter. When making high-frequency voltage measurements at very high voltage by means of an amplifying voltmeter difficulties are presented which are in part caused by the control of the high voltage and are in part due to the fact that external influences must be very carefully avoided in the case of high frequencies. Consequently, a voltage measuring instrument which ensures even under difficult conditions accurate measurements for any high voltages and frequencies by the use of an indicating instrument to be arranged at any point in such a manner as to be protected against high voltages has not hitherto been available so far as I am aware.

To overcome these difficulties, an amplifying voltmeter is connected according to the invention to a capacitive or inductive potentiometer combined with a tube designed as a diode and with the other high-frequency carrying parts within a container consisting of insulating material at the leading-in point for the high voltage and the other part of which is made of metal or is provided with a conducting coating, terminal provisions being made at the container for connecting a measuring instrument and for supplying heating current for the diode.

Preferably, a capacitive potentiometer is employed which is formed of a high-voltage condenser connected in series with one or more low-voltage condensers, an amplifying voltmeter being connected to the latter condenser or condensers. As a high-voltage condenser preferably a form is employed which consists of a pot-shaped insulating body provided with an inner and an outer conductive coating and whose inner coating is connected to the high voltage side of the line and whose outer coating acting as a screen covers the greater portion of the high-voltage condenser. In this manner it is possible to arrange, if desired, the high-voltage condenser inside the portion of the container which serves as a leading-in insulator for the high voltage, thus attaining a very compact arrangement without the necessity of dispensing with a protection against outer electrostatic or magnetic fields.

In the accompanying drawing is shown an embodiment of the invention in diagrammatic form.

Fig. 1 shows a connection diagram; and

Fig. 2 is a sectional view of an instrument according to the invention.

In Fig. 1, 1 denotes the high-voltage line, whose voltage to earth is to be measured. To the high-voltage line is connected a high-voltage condenser 2 and in series therewith a low-voltage condenser 3, the opposing electrode of which is grounded. These two condensers together form a potentiometer connected between the high voltage side and ground. Across the terminals of the low-voltage condenser 3 is connected a diode 4, its anode 5 being connected to the high potential side of the condenser and its cathode 6 being connected to the ground side. The diode is heated indirectly by a heating winding 7 energized by an alternating current 9 through the terminals 7' and, for instance, a transformer 8.

A direct-current instrument 11, for the connection of which terminals 11', 11'' are provided, is connected to the diode in a known manner through a resistance 10 connected to the anode 5. Furthermore, a condenser 12 which serves to keep away the high-frequency current from the instrument 11 is connected in parallel relation to the latter.

In the practical embodiment of the instrument shown in Fig. 2 all constituent parts with the exception of the instrument 11 and of the parts necessary for heating the diode are arranged within a container which substantially consists of a metallic casing and of a cover 13 made of insulating material and serving as a leading-in insulator. The metal casing is composed of an annular portion 14 and of a pot-shaped portion 15 firmly secured to each other by bolts 16, a packing ring 15a being placed therebetween. The opening of the annular portion 14 is closed by an intermediate bottom 17 which may consist of metal or insulating material and serves to support the inner parts. The insulating cover 13 is secured to the annular portion 14 with the aid of clamps 18 by means of bolts 19, packing rings 32 and 33 and the intermediate bottom 17 being arranged therebetween. The upper part of the insulating cover 13 is provided with a cap 20 carrying a terminal 21 and designed in the form of a bushing for a conductor 22. On the annular portion 14 are arranged the necessary terminals 11' and 11'', the former suitably insulated from the metal casing, only the terminal 11' for the direct-current instrument being shown. The grounded terminal 11'' is preferably connected directly to the pot-shaped part 15 to form the ground terminal as shown in Fig. 1.

The high-voltage condenser 2 consisting of a pot-shaped insulating body 26a having an inner coating 25 and an outer coating 26 is mounted on the intermediate bottom 17 and held in position by means of a collar 23 and insulating supports 24. The condenser dielectric 26a as well as the bushing insulator 13 are preferably made of ceramic insulating material as free of dielectric losses as possible. The outer coating 26 extends up to a collar 2' provided near the upper end of the pot-shaped body 26a so as to increase the surface leakage path, whereas the inner coating 25 substantially covers only the bottom of the pot. The capacity of the condenser 2 is so rated that the greatest portion of the high voltage to be measured is taken up by the same. The inner pot coating 25 is connected to the conductor 22 through a contact spring 27.

In the central portion of the intermediate bottom 17 is arranged a plate 28 of ceramic insulating material as free of losses as possible, the plate serving as a bushing insulator for a metal rod 29. The low-voltage condenser 3, forming the potentiometer together with condenser 2, is located, for instance, in a ceramic tube, and is connected at one end to the metal rod 29 and at the other end to the grounded metallic pot 15 through a spring contact for instance of a form similar to 27. Rod 29 is conductively connected to the outer coating 26 through another spring contact, also similar in form to 27 and arranged at the upper end of rod 29. Furthermore, the resistance 10 is connected at one end to one terminal of condenser 12 and to the terminal 11' and at the other end to the rod 29. The other terminal of condenser 12 is connected to the grounded binding post 11'' (not shown in Fig. 2). The inner parts are protected against outer electrostatic and magnetic fields by the metal casing consisting of the part 15 and of the annular portion 14 in connection with the clamps 18, whereby the outer coating 26 of the high-voltage condenser 2 at near earth potential forms a continuation of the screen within the insulating cover 13.

By suitable packing rings 15a, 32 and 33, the joints of the casing are sealed sufficiently tight so that the interior of the casing may be filled, if desired, with a compressed gas in order to increase the insulation.

What is claimed is:

1. In an instrument for measuring high voltages at high frequency, a closed casing consisting of a hollow insulator, having a terminal for connection with the high tension side of the voltage source, and of a closed pot-shaped conducting container secured to said insulator and being connected to the low tension side of said source, a high tension potentiometer disposed partly within said casing and partly within said container and connected at one end to said high tension terminal and at the other end to said conducting container, a diode within said conducting container having its cathode connected to said conducting container and its anode to a desired intermediate point of said potentiometer where only a relatively low voltage prevails between said point and the low voltage side of the source, terminal connections at said container for supplying heating current to said cathode, and terminal connections provided at said container and leading to the electrodes of said diode for connecting an electric measuring instrument to said electrodes.

2. In an instrument for measuring high voltages at high frequency, a closed casing consisting of a hollow insulator, having a terminal for connection with the high tension side of the voltage source, and of a closed pot-shaped conducting container secured to said insulator and being connected to the low tension side of said source, a high tension potentiometer disposed partly within said casing and partly within said container and comprising a high voltage condenser disposed within said casing and connected at one side to said high tension terminal, and a low voltage condenser disposed within said container and connected at one side to the other side of said high voltage condenser and at the other side to said conducting container, a diode comprising an anode and a cathode and its associated circuits arranged within said container, and having its electrodes connected across said low voltage condenser, terminal connections at said container for supplying heating current to said cathode, and terminals attached to said container and connected to the electrodes of said diode for connecting an electric measuring instrument outside of said container to said diode electrodes.

3. In an instrument for measuring high voltages at high frequency, a closed casing consisting of a hollow insulator, having a terminal for connection with the high tension side of the voltage source, and of a closed pot-shaped conducting container secured to said insulator and being connected to the low tension side of said source, a high tension potentiometer partly disposed within said casing and partly within said container and comprising a high voltage condenser consisting of a pot-shaped body of insulating material disposed within said hollow insulator and having an inner metallic coating covering its bottom and connected to said high tension terminal and an outer metallic coating covering the major outside area of said body, and a low voltage condenser disposed within said container and connected at one side with the outside coating of said high voltage condenser and connected at the other side with said conducting container, a diode comprising an anode and a cathode and its associated circuits arranged within said container, and having its electrodes connected across said low voltage condenser, terminal connections at said container for supplying heating current to said cathode, and terminals attached to said container and connected to the electrodes of said diode for connecting an electric measuring instrument outside of said container to said diode electrodes.

4. In an instrument for measuring high voltages at high frequency, a closed casing consisting of a hollow insulator, having a terminal for connection with the high tension side of the voltage source, and of a closed pot-shaped conducting container secured to said insulator and being connected to the low tension side of said source, and having a wall separating the space within said hollow insulator from the space within said conducting container, a high tension potentiometer disposed partly within said casing and partly within said container and comprising a high voltage condenser consisting of a pot-shaped body of insulating material disposed within said hollow insulator and supported on said wall but insulated therefrom and having an inner metallic coating covering its bottom and connected to said high tension terminal, and an outer metallic coating covering the major outside area of said body, and a low voltage condenser disposed within said conducting container and connected at one side through said wall, but insulated from the latter, with the outside coating of said high voltage condenser and connected at the other side with said conducting container, a diode comprising an anode and a cathode and its associated circuits arranged within said container, and having its electrodes connected across said low voltage condenser, terminal connections at said container for supplying heating current to said cathode, and terminals attached to said container and connected to the electrodes of said diode for connecting an electric measuring instrument outside of said container to said diode electrodes.

5. In an instrument for measuring high voltages at high frequency, a closed casing consisting of a hollow insulator, having a terminal for connection with the high tension side of the voltage source, and of a closed pot-shaped conducting container secured to said insulator and being connected to the low tension side of said source, and having a wall separating the space within said hollow insulator from the space within said conducting container, a high tension potentiometer disposed partly within said casing and partly within said container and comprising a high voltage condenser consisting of a pot-shaped body of insulating material disposed within said hollow insulator and supported on said wall but insulated therefrom and having an inner metallic coating covering its bottom and connected to said high tension terminal, and an outer metallic coating covering the major outside area of said body, and a low voltage condenser disposed within said conducting container and connected at one side through said wall, but insulated from the latter, with the outside coating of said high voltage condenser and connected at the other side with said conducting container, a diode comprising an anode and a cathode and its associated circuits arranged within said container, and having its electrodes connected across said low voltage condenser, terminal connections at said container for supplying heating current to said cathode, and terminals attached to said container and connected to the electrodes of said diode for connecting an electric measuring instrument outside of said container to said diode electrodes, said pot-shaped insulator and said conducting container being joined gas-pressure tight to permit the filling of said casing with gas under pressure.

LOTHAR ROHDE.